United States Patent [19]
Allan

[11] Patent Number: 4,532,267
[45] Date of Patent: Jul. 30, 1985

[54] VISION CORRECTION LENS MADE FROM AN AMINOPOLYSACCHARIDE COMPOUND OR AN ETHER OR ESTER THEREOF

[75] Inventor: G. Graham Allan, Seattle, Wash.

[73] Assignee: Board of Regents, University of Washington, Seattle, Wash.

[21] Appl. No.: 580,518

[22] Filed: Feb. 15, 1984

[51] Int. Cl.$^3$ .................. C08L 5/08; C08L 89/00; G02C 7/04
[52] U.S. Cl. .................. 523/106; 264/1.1; 351/160 H; 523/107; 523/108; 527/309; 527/312; 536/55.1
[58] Field of Search .............. 536/55.1; 351/160 H; 264/1.1; 527/309, 312; 523/106, 107, 108

[56] References Cited

U.S. PATENT DOCUMENTS

| | | | |
|---|---|---|---|
| 3,332,897 | 7/1967 | Ray-Chandhuri | 527/312 |
| 3,414,530 | 12/1968 | Zilkha et al. | 527/312 |
| 3,632,754 | 1/1972 | Balassa | 424/180 |
| 3,770,673 | 11/1973 | Slagel et al. | 527/312 |
| 3,847,897 | 11/1974 | Dunn et al. | 527/312 |
| 3,892,731 | 7/1975 | Austin | 527/312 |
| 3,998,411 | 10/1976 | Capozza | 264/184 |
| 4,029,727 | 6/1977 | Austin et al. | 264/186 |
| 4,059,457 | 11/1977 | Austin | 106/203 |
| 4,063,016 | 12/1977 | Austin | 536/20 |
| 4,168,112 | 9/1979 | Ellis et al. | 351/160 |
| 4,223,984 | 9/1980 | Miyata et al. | 351/160 |
| 4,242,291 | 12/1980 | Hughes et al. | 351/160 H |
| 4,260,228 | 4/1981 | Miyata | 351/160 |
| 4,264,155 | 4/1981 | Miyata | 351/160 |
| 4,264,493 | 4/1981 | Battista | 260/117 |
| 4,268,131 | 5/1981 | Miyata et al. | 351/160 H |
| 4,365,050 | 12/1982 | Ivani | 527/312 |
| 4,416,814 | 11/1983 | Battista | 264/1.1 |
| 4,451,629 | 5/1984 | Tanaka et al. | 264/1.1 |

OTHER PUBLICATIONS

The Merck Index, Eighth Edition, Merck & Co., Inc., N.Y., 1968, p. 537.
"Stereochemistry and Physical Characterization", Chitin, R. A. A. Muzzarelli, Pergamon Press, N.Y., 1977, pp. 69–78.
The Condensed Chemical Dictionary, Sixth Edition, Reinhold Publishing Corporation, N.Y., pp. 251 and 581.
Prudden, "The Discovery of a Potent Pure Chemical Wound–Healing Accelerator", The American Journal of Surgery, pp. 561–564, 5/70.
Pruett, "Hyaluronic Acid Vitreous Substitute", Arch Ophthalmol, vol. 97, Dec. 1979, pp. 2325–2330.
Cho, "Secret Family Prescriptions", vols. I and II, 10th Ed., 1979, pp. 26, 27, 262, 263 and 496.

Primary Examiner—Ronald W. Griffin
Attorney, Agent, or Firm—Merchant, Gould, Smith, Edell, Welter & Schmidt

[57] ABSTRACT

An oxygen permeable, wettable, optically acceptable vision correction lens can be made from homopolymers of aminoglycans, substituted aminoglycans, or crosslinked polymers thereof.

33 Claims, No Drawings

VISION CORRECTION LENS MADE FROM AN AMINOPOLYSACCHARIDE COMPOUND OR AN ETHER OR ESTER THEREOF

FIELD OF THE INVENTION

The invention relates to a vision correction lens made from an aminopolysaccharide compound. More particularly the invention relates to an oxygen permeable, wettable, optically acceptable lens which comprises an unsubstituted or substituted aminopolysaccharide compound having ester or ether groups.

BACKGROUND OF THE INVENTION

Vision correction lenses such as contact lenses and intraocular lenses have been known as commercial products for over 25 years. An acceptable lens must be optically clear, mechanically stable, and must provide sufficient optical correction, gas permeability and wettability to insure that the lens is comfortable and safe during use. Gas permeability is important since the corneal surface of the eye respires by obtaining oxygen and other substances from tear fluid and by releasing carbon dioxide and other products of respiration into tear fluid. The intimate contact and position of the contact lens can substantially prevent the exchange of such constituents between the corneal epithelial cells and tear fluid. As a result the cornea can become starved for oxygen and can accumulate harmful amounts of metabolites within the constituent cells. This can result in corneal edema (swelling) and often extreme discomfort to the wearer. Wettability of the lens is important because a nonwettable lens can be abrasive and irritating to the eye and lid and can cause significant wearer discomfort. A lens must have sufficient mechanical integrity to allow for easy cleaning and handling and maintaining the desired curvature and correction for the individual user. The lens should be immunologically compatible with the eye, reducing chances of allergic reaction or toxic response. Further the lens should be permanently dyeable, easily manufactured and available at low cost.

In the past contact lenses have been made from synthetic polymeric materials such as plastic matrices based on polyacrylate, polymethacrylate, polyhydroxyethylmethacrylate, cellulose acetate butyrate, silicones, etc. More recently contact lenses have been made from collagen, a naturally occurring protein. Miyata, U.S. Pat. No. 4,223,984 is primarily directed to a contact lens made from solubilized defatted transparent crosslinked collagen. Miyata, U.S. Pat. No. 4,260,228 is particularly directed to an improved collagen gel soft contact lens prepared from an aldehyde crosslinked gel containing a polyhydroxy compound such as glucose. Miyata, U.S. Pat. No. 4,264,155 is primarily directed to an improved lens made from collagen gel to which a water soluble organic polyhydroxy polymer has been added.

Ivani, U.S. Pat. No. 4,365,050 discloses and claims certain polymeric aminopolysaccharide compositions used in the fabrication of contact lenses which are limited to graft and block copolymers of an acetyl glycosamine in combination with compounds selected from the group consisting of silicone, collagen, acrylonitrile, acrylamide, methacrylates, alkyl methacrylates, alkyl amino alkylethacrylates, hydroxyalkyl methacrylates, pyrollidones, and vinyl derivatives of pyrollidone.

BRIEF DESCRIPTION OF THE INVENTION

I have found that an unsubstituted intentionally purified aminopolysaccharide compound or the ester and ether or amide derivatives of an aminopolysaccharide compound provide sufficient wettability, oxygen permeability, mechanical stability and optical clarity necessary for an effective vision correction lens. The first aspect of the invention is a hard or a soft contact lens which can be made from the aminopolysaccharide compounds of the invention. The second aspect of the invention is methods of forming the aminopolysaccharide compounds useful in forming vision correction lenses. A third aspect of the invention is an intraocular lens which can be surgically placed in the eye to replace or supplement the natural lens.

In this invention a lens blank or lens replica is an unfinished lens, having an approximately circular mass which can be ground, polished or otherwise shaped to the desired surface finish and dimensions of the lens. The lens blank or replica can have the approximate dimensions of about $\frac{3}{4}$ to 1 inch in diameter and about $\frac{1}{8}$ to 1 inch in thickness (about 19 to 25 millimeters in diameter and about 15 to 25 millimeters thickness). Oxygen gas permeability values ($D_K$) are generally expressed in units of millimeters ($O_2$)-cm$^2$/sec mL/mm-Hg. Measurements of oxygen permeability are typically taken at 37° C. in an oxygen consuming electrode cell (oxygen flux meter). See J. Falk, Polarographic Oxygen Sensor, CRC Press, 1976. The oxygen permeability of contact lens materials can range from about $0.1 \times 10^{-11}$ to $80 \times 10^{-11}$ $D_K$ and higher. Oxygen permeability of $4 \times 10^{-11}$ or preferably $12 \times 10^{-11}$ $D_K$ or greater has been shown to be beneficial to eye tissue, permitting sufficient exchange of nutrients between the corneal epithelium and tear. Wettability is typically measured on dry samples using a Kayness contact angle measurement. Contact angles of less than 75° and preferably less than 70° can indicate beneficial wettability.

DETAILED DESCRIPTION OF THE INVENTION

Briefly, the vision correction lenses of this invention are prepared from an unsubstituted intentionally purified aminopolysaccharide or an ester ether or amide derivative of an aminopolysaccharide compound. The vision correction lenses of this invention have been found to be exceptionally oxygen permeable, highly wettable and capable of greatly extended wear. The lenses can be hard or soft, and can have portions of varying hardness. The soft lenses of the invention can have substantial mechanical stability and beneficial hydrophilicity. The aminopolysaccharide lenses and compounds of this invention have the additional economic advantage that they are relatively inexpensive biocompatible materials. The aminopolysaccharide source used in making the lenses are naturally occurring and readily available.

We have found that the lenses can be beneficial to eyes which have been abused, damaged or injured. Aminopolysaccharide compounds have been shown to be useful in bandages, sutures, powders, etc. and can promote wound healing. A lens of this invention can be placed in an eye which has suffered abrasions or other injury from other contact lenses which can aid in the healing process while allowing sufficient vision correction to the wearer.

We have also found that the lenses can contain physiologically active compounds for the on-site controlled delivery for the treatment of ocular diseases. Additionally these lenses can be irreversibly tinted by exposure to fiber reactive dyes.

The aminopolysaccharide compounds useful in this invention for preparing vision correction lenses are derived generally from natural sources and comprise repeating units of N-substituted $C_5$ or $C_6$ aminosaccharides such as 2-amino ribose, 2-amino-glucose, 3-amino-galactose, including 2-(N-acetyl)-amino-glucose, 2-(N-acetyl)-amino-galactose or mixtures thereof. Useful N-acetyl-aminopolysaccharides can be found in abundance in naturally occurring substances such as in the hard shell of insects, crustaceans, mollusks, fungi, cell walls, etc. In nature the aminopolysaccharide compounds are the major structural component in many animals and plants. For the purposes of this application chitin and chitosan refer to the raw material derived from insect and crustacean shells from which aminopolysaccharides can be obtained. Generally the aminopolysaccharides used in forming the vision correction lenses of this invention are derived from chitin and chitosan by separating the aminopolysaccharides from calcium carbonate, protein, fats, and other naturally occurring substances that make up the shell. A major component of naturally occurring chitin is an N-acetyl glucosamine polymer. In chitin, the major proportion of the amino groups are acetylated while in chitosan the major proportion of the amino groups are generally free of any substituent. Chitin and chitosan comprise a broad spectrum of aminopolysaccharide compounds which cannot be easily distinguished because polysaccharide molecules can have various branchings, various types of saccharide units and various fractions of acetylated amine groups. The amino group substituents can be naturally formed or can be formed during aminopolysaccharide purification or lens manufacture.

The vision correction lens of this invention can be made from an intentionally purified unsubstituted aminopolysaccharide compound. These compounds can be used once they are separated from the other components of chitin or chitosan. The unmodified substantially purified aminopolysaccharide compound has few substituents on the 3, 4 and 6 hydroxyl groups of the molecule and has acetyl groups on the 2-amino group in an amount which corresponds to the naturally occurring amount characteristic of the source of the compound.

The vision correction lenses of this invention can be made from low molecular weight esters, ethers or amides of the aminopolysaccharide compound formed by reacting the aminopolysaccharide compound hydroxyl or amino groups with essentially monomeric non-polymerizable ether, ester or amide forming compounds. Aminopolysaccharide ether compounds can be made by any ether forming reaction. The Williamson synthesis reacting an alkyl halide with a sodium salt of the polysaccharide hydroxyl group is preferred. Other ether type substituents can be used such as silicone type ethers, boron type ethers. Preferred ether groups are derived by reacting an alkyl halide or an alkyl silicone halide with the aminopolysaccharide hydroxyl groups. A particularly useful ether forming reagent for use with the aminopolysaccharide compounds of this invention are lower alkyl halides or aryl substituted alkyl halides, preferably $C_1$-$C_6$ alkyl chlorides including methyl chloride, ethyl bromide, isopropyl iodide, tertiary butyl chloride, cyclohexyl chloride, benzyl chloride, etc. Methyl chloride and benzyl chloride are generally preferred in this reaction since they react smoothly in good yield and without substantial degradation. An appropriate catalyst to facilitate the reaction between the alkyl halides is any generally basic catalyst such as sodium hydroxide, potassium hydroxide, magnesium hydroxide, etc. These materials can be suspended or dissolved in substantially nonreactive polar solvents such as methyl ethyl ketone, N,N-dimethylformamide, N,N-dimethylacetamide, etc.

Ester derivatives can be formed by reacting the polysaccharide hydroxyl groups with a hydroxyl reactive acid compound. Hydroxyl reactive acid compounds can include carboxylic acids, carboxylic acid anhydrides, carboxylic acid halides, sulfonic acids, phosphoric acids, boric acid compounds, etc. Preferred ester forming reagents include the reactive carboxylic anhydride and carboxylic acid halide compounds.

A particularly useful esterifying agent for use with the aminopolysaccharide compounds of this invention are carboxylic acid anhydrides such as n-butyric anhydride, valeric anhydride, propionic anhydride, isobutyric anhydride, caproic anhydride, caprylic anhydride, heptanoic anhydride, nonylic anhydride, undecylic anhydride, succinic anhydride and maleic anhydride. In this invention, the carboxylic acid anhydrides are generally preferred since they react smoothly, in good yield, and without substantial degradation. A preferred compound is n-butyric anhydride for reasons of its effectiveness. An appropriate catalyst to facilitate the reaction between the butyric anhydride and the aminopolysaccharide compound is any generally acidic catalyst. Acidic compositions such as phosphoric acids, acidic resins, sulfonic acids and others can be used. These materials can be suspended in a substantially nonreactive but polar solvent such as methylethylketone, methylisobutylketone, N,N-dimethylformamide, and dimethylacetamide. Amides are prepared similarly to the ester except that the starting material usually is an aminopolysaccharide containing a large proportion of free amino groups.

CROSSLINKING

The aminopolysaccharide compounds of this invention can be crosslinked in order to increase the durability, mechanical stability, and useful life. Biologically derived materials such as aminopolysaccharides can be biodegradable and can be slowly attacked in the eye through the naturally occurring response of the eye to the foreign aminopolysaccharide substance. Crosslinking of the aminopolysaccharides can act to counteract the tendency of the lens to biodegrade. Crosslinking acts to stop biodegradation by crosslinking between hydroxyl groups between amino groups and between hydroxyl and amino groups in adjacent aminopolysaccharide molecules. These bonds can cause the functional groups of the aminopolysaccharide compound to be less subject to biodegrading substances in tear fluid such as enzymes and antibodies. Crosslinking can be carried out by exposing the aminopolysaccharide compound, the aminopolysaccharide compound lens blank or replica, or finished lens to a suitable crosslinking agent. Crosslinking agents comprise polyfunctional compounds having hydroxyl or amino reactive moieties separated by a group sufficient that the moieties can react with separate, adjacent aminopolysaccharide molecules. Examples of useful crosslinking agents which may be employed to form the contact lens compositions of the invention include di-, tri- and tetra-substituted carboxylic acid compounds, aliphatic aromatic diisocyanates, polyfunctional chloroformates, polyfunctional sulfonyl chlorides, aldehyde crosslinking agents, acrolein, glyoxal, dialdehyde starch, etc.

FIBER REACTIVE DYES

The lens or lens composition can be substantially permanently dyed using fiber reactive dyes, that is, those dyes containing a functional or reactive group capable of attaching the chromophore groups by forming covalent chemical bonds with hydroxyl or amino functional groups of the aminopolysaccharide compound The chromophore group can be an azo compound, which can yield a red, blue, violet, or yellow tint, an anthraquinone compound, which can yield a royal blue tint, a phthalocyanine residue, for a turquoise blue tint, or other chromophore groups known in the art. Other suitable dye stuffs can include a monochlorotriazine group, dichlorotriazine group, vinyl sulfone group, trichloropyrimidyl group, dichloroquinoxaline group, ethylene sulfonimide group, cyclic ethylene immonium-type group, and acrylamide group, among others. While most fiber reactive dyes find utility in this invention, the preferred dyes are the chlorotriazine dyes, because of their accessibility, the large amount of information available on these dyes, their relative reactivity at room temperature, and the broad range of colors available.

Where the reactive group of the dye contains a chlorine, it is expected that the chlorine will combine with a hydrogen of an amino or hydroxyl group of the aminopolysaccharide compound, yielding HCl by-product. A covalent bond thus forms between the carbon atom of the dye and the amino or hydroxyl group of the aminopolysaccharide compound.

Fiber reactive dyes and other suitable substances can also be used with the lenses and lens compositions of this invention to yield a substantially opaque lens. An opaque lens can be desirable when for medical or other reasons it is desired to shield an eye tissue from light. An opaque lens of this invention can in many instances be worn in place of the traditional eye patch which can be uncomfortable and cosmetically unattractive.

For a discussion of fiber reactive dyes, see Beech, W. F., *Fiber Reactive Dyes,* Logos Press, Ltd., London, 1970.

PHYSIOLOGICALLY ACTIVE COMPOUNDS

Physiologically active compounds can also be included in the lens or lens composition. These compounds can include antibiotics such as tetracycline, bacitracin, and neomycin, antiallergic products such as chlorpheniramine, decongestive substances such as pseudoephedrine and tetrahydrazoline, antiviral products such as idoxuridine, and other substances such as analgesics, anaesthetics, antiseptics, and others. When included in the lens, the physiologically active compounds can be released at a controlled rate upon the placing of the lens in the eye.

OTHER COMPONENTS

If desired, other constituents such as humectants can be incorporated into the lens composition. Suitable humectants can stabilize the vision correction lenses to effects of water. Such constituents having a significant degree of compatibility with aminopolysaccharide compounds include glycerol, ethylene glycol, propylene glycol, and sorbitol.

A plasticizer can be particularly advantageous in the context of this invention in order to more easily compound or form the aminopolysaccharide compound. Without a plasticizer, the forces between the chains of molecules in the aminopolysaccharide compound can often be so strong as to prevent slippage of the molecules preventing the lens material from conforming to a mold. The plasticizer can reduce the bonding force between the chains of molecules allowing them to take the shape of the mold. The plasticizer can reduce the hydrogen bonding between the functional group of one polymer molecule, and functional groups of another. While the plasticizer can be removed from the lens to create the finished product, the plasticizer can also be left in the lens if nontoxic and stable.

METHODS OF MAKING SUITABLE SUBSTITUTED AMINOPOLYSACCHARIDE COMPOUND

Turning now to the methods of making a substituted aminopolysaccharide compound which can be used in forming the oxygen permeable, wettable, optically clear lens of the invention, a mixture comprising an ether-forming, ester-forming or amide-forming agent such as an alkyl halide, carboxylic acid anhydride or an acid chloride, a naturally occurring raw chitin comprising an aminopolysaccharide compound, and a catalyst which facilitates a reaction between the ether-, ester- or amide-forming agent and the aminopolysaccharide compound can be formed. Second, the mixture is suspended in a substantially nonreactive solvent, to facilitate admixture and reaction of the agent, the aminopolysaccharide compound, and the catalyst. As the aminopolysaccharide compound and the agent react, the reaction product passes into solution. In order to isolate the derivatized aminopolysaccharide, a precipitating amount of an anti-solvent, which is substantially miscible with the nonreactive solvent is added to the filtered reaction liquor to precipitate the reaction product of the aminopolysaccharide compound and the ether-, ester- or amide-forming agent. Examples of appropriate anti-solvents include water, methanol, ethyl alcohol, etc. Next, any excess agent can be removed. This can be done by ion exchange, neutralization, dialysis, washing or other techniques.

Last, the precipitate can be collected, for example, by filtration, and washed, for example, with distilled water, to remove any remaining traces of agent, salt or other undesirable materials.

FORMING A CONTACT LENS

The lens of this invention can be formed from the aminopolysaccharide compound by a variety of methods. Stationary casting, spin casting, molding, and lathe cutting, can be useful processes for fabricating the lenses.

STATIONARY LENS CASTING

To form a lens by stationary casting, a lens-forming amount of a solution comprising a sufficient amount of aminopolysaccharide compound or derivatives, dissolved or suspended in an appropriate solvent can be added to a mold for stationary casting. A lens blank or lens replica can be formed in this mold by removing the solvent and then the lens can be finished for use in the eye. In more detail, the aminopolysaccharide compound can be brought into solution or suspension by combining it with acetic acid and water, for example, a solution comprising 0.5 to 5% of an aminopolysaccharide compound, 0.5 to 5% acetic acid, and water.

Generally, aminopolysaccharide compounds are insoluble in water. However, with the addition of a solubilizing amino salt forming acid such as acetic acid other appropriate compound, a soluble salt of the aminopolysaccharide compound can form. When acetic acid is used, the acetate salt of the amino group can form.

This solution can be introduced into a suitable lens shaped mold. A suitable mold can be made of an acrylic material, with a polished hemispherical cavity and a diameter of, for example, 10-20 millimeters, and a depth of approximately 10-20 mm. Solvent is removed from the solution in the mold. This can be accomplished by use of a vacuum system, a heat source such as a sun lamp, or simply at ambient temperature and by any known means. When the casting is dry, it can be removed from the mold. It is advisable to wash or neutralize the casting, in order to remove traces of acetic or other acid which may be present. This can be done by exposure of the casting to an appropriate base, for example, by soaking the casting in a 0.5% to 15% aqueous solution of sodium hydroxide. If a 5% solution is used, it is advisable to soak the casting for about an hour. Following this procedure, it is advisable to further cleanse the casting to remove traces of the strong base. This can be done by washing the casting, for example, repetitively rinsing it with distilled water.

HIGH PRESSURE LENS FABRICATION

Another method for making a lens from an aminopolysaccharide compound or derivative thereof involves forming the lens in a mold using high pressure using a plasticizer if necessary. In this method, first a soft flexible film is created from the aminopolysaccharide compound, and the film is molded to form the lens blank or replica. The mold can be of a type known in the art, for example, made of steel and used under conditions known in the art such as 90° C. with a platen pressure of 15,000 lbs.

In order for the lens blank or lens replica to hold the shape of the mold, the aminopolysaccharide compound can be plasticized before molding. First, a solution can be made comprising acetic acid, an aminopolysaccharide compound, a plasticizer, and an agent to disrupt the molecular structure of the aminopolysaccharide compound. A typical solution can be 0.5 to 5% aminopolysaccharide compound, 0.5 to 5% acetic acid, di(hydroxyethyl)sulfoxide, and lithium chloride. The lithium chloride can act as the disrupting agent, that is, it can break up the molecular order of the aminopolysaccharide compound, thus permitting it to interact more readily with the sulfoxide. The sulfoxide can work as the plasticizer, where it reduces the hydrogen bonding between molecules and thus allows the chains of molecules in the aminopolysaccharide compounds to more easily slip past one another and conform to and hold the shape of the mold.

The mixture identified above can be thoroughly stirred to facilitate interaction of the components. Then it can be formed into a soft flexible film, for example by pouring it onto a polyethylene film and drying. The soft flexible film can then be molded in a mold known in the art, forming a lens blank or replica. It is preferable to neutralize the lens blank to remove any traces of acetic acid. This can be done by exposing it to a base, such as a 0.5 to 15% solution of sodium hydroxide for a period of time, for example, 20 minutes. It is then advisable to remove traces of the base, or for example by repeatedly washing the lens blank with water, preferably for reasons of purity, distilled water.

Instead of a solution comprising acetic acid, an aminopolysaccharide compound, lithium chloride, and sulfoxide, a solution comprising dimethylacetamide, an aminopolysaccharide compound, lithium chloride, and a sulfoxide can be used. Where dimethylacetamide is used rather than acetic acid, it is unnecessary to neutralize the lens blank after forming it.

SPIN CASTING

Another method for forming a lens involves spin casting. The spin casting mold is known in the art and can be made from a copolymer comprising methacrylate. A solution can be made of an aminopolysaccharide compound, acetic acid or other substance which will facilitate the aminopolysaccharide compound going into solution by the formation of its soluble salt, and a solvent such as water. Again, the proportions of acetic acid and the aminopolysaccharide compound are not critical and can range anywhere from 0.5% to 5% or more. The solution is introduced into the mold and spun. A source of heat such as a sun lamp, a vacuum arrangement, or some other means can be used to aid in the evaporation of the water from the solution as the mold is spinning. When the lens blank or lens replica is dry, the spinning action can be stopped and the lens removed. If acetic acid or some other acid has been used to bring the aminopolysaccharide compound into solution, the acid in the lens blank should be neutralized. Preferably the lens blank is then thoroughly washed to remove caustic or other impurities. As known in the art, the curvature and thickness of the lens will be in part determined by the speed of rotation of the mold, the duration of spinning and the viscosity of the solution.

MACHINING

It is also envisioned that a lens of the present invention can be made by machining or lathe cutting. Machining or lathe cutting involves obtaining a solid mass of the aminopolysaccharide compound lens material and removing with a lathe or other means the excess material, to yield a lens blank. With certain aminopolysaccharide compounds, a powder can be obtained and pressed together in a hot press to yield the solid mass of the substance. From this mass, a lens blank or lens replica can be machined. The lens blank or replica can then be machined and polished finished to form a lens.

For certain aminopolysaccharide compounds, such as the aminopolysaccharide derived from chitosan, it is preferred to form a solid mass from the solution. A solution can be made comprising the aminopolysaccharide compound and acetic acid in water. One layer of this solution can be evaporated down to a thin film, a second layer can be poured on top of it and evaporated down, and so on. Layers of the solution can repeatedly be evaporated until a workable thickness of the aminopolysaccharide compound can be obtained. Generally, a workable thickness will be at least about 1/10 of an inch thick, or preferably, for reasons of ease in handling, at least about ⅛ of an inch thick. From this build-up of layers, a lens blank or lens replica can be machined, and then finished to form a lens.

The following specific Examples which include the best mode were prepared and tested as described.

EXAMPLE 1

Preparation of an Intentionally Purified Aminopolysaccharide Ester Compound, Namely, An Aminopolysaccharide Butyrate Into a suitable reaction vessel was charged and mixed 12 milliliters of liquid methanesulfonic acid and 18 milliliters of n-butyric anhydride. To this mixture, with kneading, at room temperature, was added 3 grams of raw chitin powder derived from crab. After kneading for 1 hour, the mixture resembled a paste. To the resulting paste was added 70 milliliters acetone, to the thus-formed acetone solution was added, with vigorous stirring, 500 milliliters of ice water, forming a precipitate comprising a colorless amorphous powder. The precipitate was washed with 300 milliliters of water, 3 times. It was then suspended in 300 milliliters of water and neutralized to a pH of 7.0 using 7 milliliters of 1% NH$_4$OH. The suspension was boiled for 5 minutes. Next the precipitate was collected by filtration, washed 3 times with 300 milliliter portions of water and dried overnight at 105° C. to yield 4.1 grams of the perbutyrated aminopolysaccharide compound.

The product was tested for oxygen permeability at 37° C. using an oxygen flux meter and found to have an oxygen permeability of $14 \times 10^{-11}$ ml (O$_2$)-cm$^2$/sec-mL/mm Hg.

The wettability of the product was determined by visual observation of the contact angle made with water, and the rate of wetting by water. The product was found to be adequately wettable without added wetting agent.

EXAMPLE 2

Contact lens from an Aminopolysaccharide Compound using a Stationary Casting Process Into an acrylic mold having a polished hemispherical cavity of 14 millimeters in diameter was placed 1 milliliter of a 10% aqueous solution of poly-N-acetyl glucosamine derived from raw chitosan, and 1% acetic acid. The solution in the mold was allowed to dry at room temperature for 2 days. After 2 days, the dry casting was removed from the mold and placed into a 5% aqueous solution of sodium hydroxide. The casting was allowed to soak in this solution for 1 hour and then washed 5 times with distilled water. The casting was a strong, clear, soft lens blank with excellent optics and a water content of 49%. The oxygen permeability of the lens blank was tested at 37° C. using an oxygen flux meter and found to be $7 \times 10^{-11}$ ml(O$_2$)-cm$^2$/sec-mL/mm Hg.

EXAMPLE 3

Preparation of an Aminopolysaccharide Compound Lens by Spin Casting

An acrylic mold for spin casting was made from a 16 milliliter diameter button of a copolymer of 2-hydroxyethylmethylacrylate and methyl methacrylate. The inside curvature of the mold was 12.5 millimeters. The mold was held on the shaft of a rotating spindle by a grip arrangement.

Into the mold was poured in a quantity to substantially fill it, a 4% aqueous solution of poly-N-acetyl glucosamine derived from raw chitosan. The spindle was rotated while a 275 watt sunlamp was held over the mold at a distance of 8 centimeters. When the lens was dry, the spindle was stopped, the mold removed, and the lens blank removed from the mold. The lens blank was then soaked for 1 hour in a 10% NaOH solution. After soaking, the lens blank was washed thoroughly with distilled water.

A soft, clear, hydrophilic, water absorbing, oxygen permeable lens blank with excellent optics was obtained.

EXAMPLE 4

Preparation of an Aminopolysaccharide Lens by Molding of an Aminopolysaccharide Compound Derived from Chitosan A 2% solution of poly-N-acetyl glucosamine derived from raw chitosan in 100 milliliters of water containing 2% acetic acid was plasticized by treatment with 1 gram di(hydroxyethyl)sulfoxide having a melting point of 112°–113° C. and 1 gram lithium chloride. This mixture was thoroughly stirred. A soft flexible film was obtained by accumulating layers of material onto a polyethylene film and air-drying. The film was then molded in a steel mold at 90° C. under a platen pressure of 15,000 lbs., forming a lens blank. The lens blank was removed from the mold, and immersed in a 10% sodium hydroxide solution for 20 minutes. The lens blank was then repeatedly washed with distilled water until clear.

This lens blank was observed to be soft, hydrophilic, water absorbing, and oxygen permeable.

EXAMPLE 5

One hundred milligrams of Cibacron blue TG-4, a fiber reactive dye produced by the Ciba-Geigy Company, was dissolved in 10 milliliters of water. Into the solution was placed a contact lens prepared by the stationary casting process shown in Example 2. The lens was soaked for 1 hour, removed from the solution, and then soaked for 30 minutes in 10 milliliters of a 1% sodium hydroxide solution. The lens was removed from the solution and then washed exhaustively with distilled water to obtain a tinted blue lens.

The lens was placed in a bottle containing 25 milliliters of water for six months. An examination of the contents of the bottle revealed that no observable leaching of the dye from the lens had occurred.

EXAMPLE 6

Example 5 was repeated exactly with the exception that a lens obtained by the spin-casting process of Example 3 was used in the place of the lens obtained by the stationary casting process. No leaching of the dye could be observed.

EXAMPLE 7

Example 5 was repeated exactly with the exception that a lens obtained by the molding of an aminopolysaccharide compound derived from chitosan was used in the place of the lens obtained by the stationary casting process. Again, no leaching of the dye could be observed.

EXAMPLE 8

Crosslinking of an Aminopolysaccharide Lens Derived from Raw Chitosan

Into 15 milliliters of an aqueous 1% formaldehyde solution was placed the lens blank of Example 2, for 30 minutes. The lens blank was removed from solution and washed with 15 milliliters of distilled water 3 times. A semi-flexible lens blank was obtained.

EXAMPLE 9

Example 8 was repeated exactly with the exception that 15 milliliters of an aqueous 1% glutaraldehyde solution was used in place of the 15 milliliters of an aqueous formaldehyde solution. The results were the same.

EXAMPLE 10

Wound Healing Property of Contact Lens Based on Aminopolysaccharide

Fifty lenses were made by the stationary casting process as previously described. Incisions were made in the eyes of rabbits and the lenses were placed over these incisions. Accelerated healing of wounds was observed.

The following Table summarizes the experimental results presented in the above described Examples:

TABLE OF RESULTS

| | Oxygen Permeability ($D_K/L$) | Wettability | Tinted by Exposure to Fiber Reactive Dye | Subjective Results | Crosslinking with Formaldehyde | Crosslinking with Glutaraldehyde |
|---|---|---|---|---|---|---|
| Aminopolysaccharide butyrate contact lens material | $14 \times 10^{-11}$ | No added wetting agent needed | | | | |
| Stationary cast aminopolysaccharide lens | $7 \times 10^{-11}$ | | no leaching of dye | strong, clear, soft, excellent optics, contains 49% water | semi-flexible lens blank obtained | semi-flexible lens blank obtained |
| Spin cast aminopolysaccharide lens | | | no leaching of dye | clear, soft, excellent optics, hydrophilic, water absorbing, oxygen permeable | | |
| Molded aminopolysaccharide lens | | | no leaching of dye | soft, hydrophilic, water absorbing, oxygen permeable | | |

The foregoing Examples and discussion is a description of the invention. However, since many embodiments can be made without departing from the spirit and scope of the invention, the invention resides in the claims hereinafter appended.

I claim:

1. An oxygen permeable, wettable, optically acceptable vision correction lens comprising a polymer consisting essentially of a homopolymer of an aminoglycan.

2. The vision correction lens of claim 1 wherein the amino groups of the homopolymer of the amino glycan have amide substituents.

3. The vision correction lens of claim 2 wherein the amide substituents are of natural origin.

4. The vision correction lens of claim 2 wherein the amide substituents are of synthetic origin.

5. The vision correction lens of claim 1 wherein the homopolymer is crosslinked.

6. The vision correction lens of claim 5 wherein the homopolymer is crosslinked using an aldehyde compound crosslinking agent.

7. The vision correction lens of claim 1 wherein the aminoglycan comprises a glucosamine, an N-acetyl glucosamine, a galactosamine, an N-acetyl galactosamine, or mixtures thereof.

8. The vision correction lens of claim 1 wherein the homopolymer is an ester of the homopolymer.

9. The vision correction lens of claim 8 wherein the ester of the homopolymer is a carboxylate ester.

10. The vision correction lens of claim 9 wherein the carboxylate ester is a butyrate, an acetate, a benzoate, or a succinate ester.

11. The vision correction lens of claim 1 wherein the homopolymer is an ether of the homopolymer.

12. The vision correction lens of claim 11 wherein the ether is a methyl ether, an ethyl ether, an hydroxy ethyl ether, or an isopropyl ether.

13. The vision correction lens of claim 11 wherein the ether is a silanol ether.

14. The vision correction lens of claim 1 wherein the lens is colored by reacting the homopolymer with a fiber reactive dye.

15. The vision correction lens of claim 1 wherein the vision correction lens also contains a physiologically active compound dispersed throughout the lens material.

16. A method of forming a vision correction lens which comprises the steps of:
   (a) adding a lens forming amount of a solution of a homopolymer of an aminoglycan or a crosslinked homopolymers thereof in an appropriate solvent into a mold for stationary casting;
   (b) forming a lens blank or lens replica, and finishing the lens.

17. A method of forming a vision correction lens which comprises the steps of:
   (a) plasticizing a homopolymer of an aminoglycan or a crosslinked homopolymer thereof dissolved in an appropriate solvent to form a plasticized lens material;

(b) forming the plasticizing material into a lens blank or lens replica; and (c) finishing the lens.

18. An oxygen permeable, wettable, optically acceptable wound healing lens comprising a polymer consisting essentially of a homopolymer of an aminoglycan.

19. The wound healing lens of claim 18 wherein the amino groups of the homopolymer of the aminoglycan have amide substituents.

20. The wound healing lens of claim 19 wherein the amide substituents are of natural origin.

21. The wound healing lens of claim 19 wherein the amide substituents are of synthetic origin.

22. The wound healing lens of claim 18 wherein the homopolymer is crosslinked.

23. The wound healing lens of claim 22 wherein the homopolymer is crosslinked using an aldehyde compound crosslinking agent.

24. The wound healing lens of claim 18 wherein the aminoglycan comprises a glucosamine, an N-acetyl glucosamine, a galactosamine, an N-acetyl galactosamine, or mixtures thereof.

25. The wound healing lens of claim 18 wherein the homopolymer is an ester of the homopolymer.

26. The wound healing lens of claim 25 wherein the ester of the homopolymer is a carboxylate ester.

27. The wound healing lens of claim 26 wherein the carboxylate ester is a butyrate, an acetate, a benzoate, or a succinate ester.

28. The wound healing lens of claim 18 wherein the homopolymer is an ether of the homopolymer.

29. The wound healing lens of claim 28 wherein the ether is a methyl ether, an ethyl ether, a hydroxy ethyl ether, or an isopropyl ether.

30. The wound healing lens of claim 28 wherein the ether is a silanol ether.

31. The wound healing lens of claim 18 wherein the lens is colored by reacting the homopolymer with a fiber reactive dye.

32. The wound healing lens of claim 18 wherein the wound healing lens also contains a physiologically active compound dispersed throughout the lens material.

33. The lens of claim 18 wherein the lens parameters provide optical vision correction.

* * * * *

UNITED STATES PATENT AND TRADEMARK OFFICE
CERTIFICATE OF CORRECTION

PATENT NO. : 4,532,267
DATED : July 30, 1985
INVENTOR(S) : G. GRAHAM ALLAN

It is certified that error appears in the above-identified patent and that said Letters Patent are hereby corrected as shown below:

In Item [73], after "Assignee:", for "Board of Regents,
    University of Washington, Seattle, Wash." read
    --Washington Research Foundation, Seattle, Wash.--
Column 2, line 22, for "1/8" read --5/8--.
Column 2, line 46, for "ester ether" read --ester, ether--.

Signed and Sealed this

Nineteenth Day of November 1985

[SEAL]

Attest:

DONALD J. QUIGG

Attesting Officer

Commissioner of Patents and Trademarks